April 2, 1957     C. W. SKARSTROM     2,787,444
HEAT EXCHANGER AND MEANS FOR CIRCULATING FLUIDS
Filed July 27, 1954     2 Sheets-Sheet 1

Charles W. Skarstrom    Inventor

By *George J. Silhavy*    Attorney

Charles W Skarstrom Inventor

United States Patent Office 2,787,444
Patented Apr. 2, 1957

2,787,444

HEAT EXCHANGER AND MEANS FOR CIRCULATING FLUIDS

Charles W. Skarstrom, Montvale, N. J., assignor to Esso Research and Engineering Company, a corporation of Delaware Application July 27, 1954, Serial No. 445,991

4 Claims. (Cl. 257—18)

The present invention relates to an apparatus for producing high velocity jets of gaseous materials. More particularly the invention relates to a means for circulating the fluid forming an atmosphere existing in a closed container or housing for instruments, wherein said instruments are to be maintained in an atmosphere of a temperature, humidity or the like which is substantially uniform and constant throughout the container. A specific adaptation of the invention contemplates the employment of an apparatus of the type disclosed in combination with a thermostatically controlled heating unit to maintain a constant and uniform temperature throughout the confines of an insulated housing for an instrument such as may be employed for process control in a manufacturing operation. It is also contemplated that the invention may be employed in other ways, as for example as a room air circulator, or as a means to provide for more sensitive operation of instruments designed to respond to changes in temperature of humidity such as thermostatic devices or humidistats and the like.

As an example of the field of service for an apparatus according to the present invention, reference is made to the growing use of sensitive analytical and process control instruments under field conditions. Many of these instruments require operating conditions substantially as well controlled and maintained as would be normal to a laboratory operation. A most usual requirement is that the analyzer or process control instrument be operated in an atmosphere maintained at a substantially constant and uniform temperature. In the field, such an operating condition is most difficult to attain, particularly when the instruments may be remotely located. Where heated and insulated housings have been provided, it has been found that stratification may occur within the housing, with a consequent overheating of one area and underheating or chilling of another area within the housing. To overcome such stratification, motor-driven, circulator fans or blowers have been employed. This expedient has introduced additional problems, however, principally of maintenance. Where motor-driven fans or blowers have been thus employed, it has been found that in continuous use in an environment of relatively high temperature, lubrication failures and overheating occurs. In addition, it has been found that the heat normally produced by the fan or blower motors, even when such motors are insulated from the instrument area, tends to upset control of temperatures in the instrument area. As a result, field use of sensitive analysis and process control instruments has been inefficient and uneconomical.

It is an object of the present invention to provide an efficient and economical means whereby field use of laboratory type instruments becomes feasible, efficient, and economical. A specific object of the invention is to provide means for circulating air, or another gaseous material in a confined space without the use of motor-driven fans or blowers, and without generation of uncontrolled or uncontrollable extraneous heat. It is a further object of this invention to provide suitable economical and efficient means for such purposes, which will be operable continuously and over extended periods with a minimum of attention and maintenance.

The invention and its objects may be more fully understood from the following specification when it is read in conjunction with the accompanying drawings, in which:

In Fig. 2, the apparatus is shown partly in vertical section.

Figure 1:
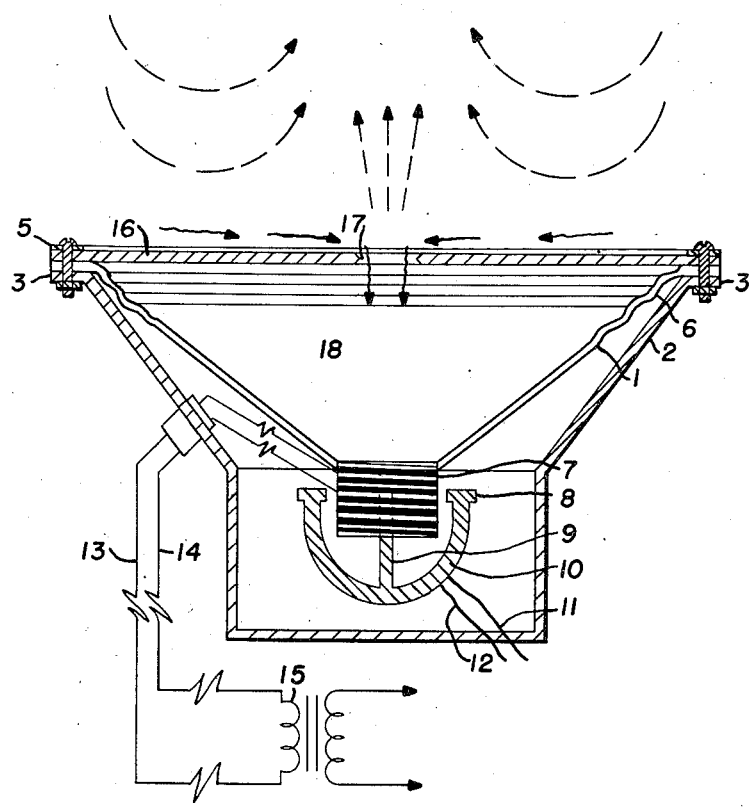
Fig. 1 is a vertical section through a pump mechanism according to the present invention.

Referring to the drawings in greater detail, in Fig. 1 the numeral 1 designates a conical diaphragm of a fluid pump according to the invention. As shown, the diaphragm 1 is the equivalent of the sound radiating cone of a radio loud-speaker. In general a conventional radio loud-speaker, such as is commercially available, is adaptable for the purpose at later described. In the assembly illustrated, the speaker includes a substantially conical frame support 2, having a peripherally flanged base end 3, and an apex end 4. The diaphragm 1 is a typical loud-speaker cone, secured at its base end in fixed relation to the frame at the flange 3 as by an adhesive material and a retainer ring 5. The diaphragm cone 1, as shown, is provided with an elastic or deformable circumferential section such as the series of circumferential corrugations 6 which extend from the line of attachment of the cone to the flanged end 3 of frame 2 toward the apex end of the cone. The apex end of the diaphragm is secured to a movable coil 7, which in a loud-speaker would be called a voice coil. A field magnet 8 is supported at the apex end of the frame 2, and includes core 9, and thereon a magnetic field winding 10 connected to a source of direct current, as by means of leads 11 and 12, to produce a steady magnetic field. Alternately, and preferably, the steady magnetic field may be induced by means of a permanent type magnet in order to avoid the heat which would be generated by field winding 10. The coil 7 is provided with leads 13 and 14 connected to an alternating current source, as through a low voltage output transformer 15. The flow of current through the movable coil produces a magnetic field of alternating polarity which reacts with the magnetic field of the electromagnet, or fixed magnet, to induce reciprocal motion of the coil at a cyclical rate equivalent to that of the current passed therethrough. Motion of the coil in turn sets up a corresponding vibration or pulsation of the diaphragm to which it is attached.

In the apparatus contemplated, the vibratory or pulsating motion induced in the diaphragm 1 is utilized as a pump action by means of a pump plate 16. The plate 16 covers the base end of the diaphragm cone 1, being secured transversely thereof to the frame 2, and flange 3, in fluid-tight relation thereto. A port 17 in the plate 16 provides both an inlet and an outlet to the internal chamber 18 formed between the diaphragm 1 and plate 16.

In operation, vibration or pulsation of the conical diaphragm induces alternate expansion and contraction of the volume of chamber 18 to produce a pumping action. This pumping action is utilized to its fullest extent by proper sizing of the port 17 to accommodate an optimum fluid volume of intake as the chamber 18 is expanded, and to permit expulsion of the inspirated fluid at an optimum velocity as the chamber is contracted. Without specific limitation to any particular theory, the pumping action which is obtained is believed to result from fluid being drawn through the port 17 from a large external solid angle, forming what may be termed a "vena contracta" inwardly of the plate 16, and then being ejected from the chamber and through the same port at high velocity to form a jet of small solid angle. Reciprocation of the coil 7, and thereby of the conical diaphragm 1 causes the fluid within chamber 18 to be ejected as a series of puffs, corresponding in frequency to the alternating cycle of the current passed through the coil. The puffs issuing through the port 17 induce flow of the fluid, beyond and in the vicinity of the port, in the direction of the jet to produce a substantially continuous flow stream. In summary, the inward flow of fluid through the port 17 is from a large area over the outer surface of the plate 16 with the flow lines widely dispersed. This is indicated in Fig. 1 by sinuous arrows. The jet effect inwardly of the plate is quickly dispersed within the chamber 18. The outward flow of fluid through the port 17, being into a substantially unconfined atmosphere, at least one of substantially greater volume than that of chamber 18, the impulse imparted by contraction of the chamber expels the fluid in the chamber through the small area of an external "vena contractor" produced by momentum of the expelled fluid toward the center of the jet. The flow lines of the expelled fluid are substantially indicated by dotted line arrows in Fig. 1. The flow pattern into and out of the chamber 18, by way of the port 17, may thus be characterized as being substantially asymmetric, in that flow into the port 17 is from a large area over the outer surface of the plate 16, while the flow outwardly through the port is through the small area of the external "vena contractor" referred to. The jet of expelled fluid in turn induces flow of fluid from the surrounding atmosphere as indicated by curved arrows.

Various factors have been determined to have an effect on the efficiency of operation of the apparatus which has been illustrated by Fig. 1 and described with reference thereto. For example, while any available alternating current cycle may be employed, for a specific combination of diaphragm, coil and magnet, that frequency which produces the most efficient result is one at which the diaphragm cone and/or elastic supports therefor are in resonance. Further, in order to obtain the maximum benefits from the apparatus according to this invention, it is essential that the diameter of the port 17 be specifically related to other structural and operational characteristics of the speaker cone. To explain the significance of such correlation, let it be assumed that the diaphragm is made to move at a constant amplitude. With a port diameter equal to the diaphragm diameter, gas merely moves back and forth without producing any jet effect. If the port is made very small, say 1% of the diaphragm diameter, very little gas is moved through the pump hole. Adiabatic compression and expansion occurs in the gas between the pump plate and the diaphragm producing maximum pressure differentials.

When using a cone diaphragm type loud-speaker with a constant voltage on the voice coil, the amplitude of motion depends upon the port diameter. Thus, with large holes, the amplitude of cone motion is large. Very little jet effect is observed. The voice coil current is low and out of phase with the voltage. Most of the real power used will go into the cone supports and restraining (damping) devices. When the pump hole is small, the amplitude of cone motion is small and large currents occur in the voice coil. The jet effect is present, but it is small. The real power used will go mainly into heating the voice coil wires.

When the port diameter is about 25% of the effective diameter of the diaphragm, the cone's amplitude of motion is about one-half of the free amplitude. The jet effect is at a maximum. The voice coil current is about the same as measured with no pump plate, but it is now in phase with the voltage. This indicates a maximum transformation of electrical energy into mechanical energy, producing a fluid jet as desired. The pneumatic load is matched to the electrical driver. The fluid jet caused by the breathing action through the port causes the largest stirring or circulating action as a result of the thrust of the jet produced. The object is to obtain in the fluid issuing from the port 17 the maximum kinetic energy, as may be expressed by the product of the quantity breathed times the square of the exit velocity. It has been found that this maximum result is obtained when the port diameter is approximately 25% of the effective diameter of the diaphragm. This relationship may be more precisely determined from the following formula (a) $$d = 0.273 (D - 1.0)$$

wherein:

$d$ = the port diameter in inches; and
$D$ = the "effective diameter" of the speaker cone in inches.

For example, given an effective speaker diameter of 6 inches, if this is substituted in the above equation, the port diameter will be determined at 1.365 inches. A variation from this port dimension may be permitted without substantial detriment in the range of from 130% to 80% of the computed value.

In the form of speaker cone which is illustrated in Fig. 1, the "effective diameter" ordinarily may be taken as the diameter of the cone at the apex end of the series of circumferential corrugations. The form of speaker cone illustrated, however, is only one of a variety available. Other forms may vary from that shown, particularly as to the elastic or deformable means provided to permit vibratory motion of the speaker or diaphragm cone. For example the base end of the cone may be attached to the frame through a substantially annular strip of a flexible material instead of the elastic or deformable circumferential section provided by the corrugations 6 in the structure here described and illustrated, or in some instances substantially the entire cone surface may be corrugated circumferentially from the base to the apex.

In any form of speaker construction, the overall diameter of the speaker, including the frame flange 3, and cone retainer ring 5, is generally designated as the "nominal diameter" of the speaker. The "effective diameter" of the speaker may vary, however, from speaker to speaker, according to the form of the cone and, to some extent, other structural details peculiar to the techniques and practices of the individual manufacturer. For the purpose of this invention, therefore, it is necessary to establish a uniform procedure for determination of the "effective diameter" of any speaker employed. This may be done by reference to and actual measurement of the linear displacement of the speaker voice coil and the volume displacement of the speaker cone concomitant therewith. These measurements may be made according to any conventional or generally accepted procedure and when obtained may be substituted in the following formula:

(b) $$D = \sqrt{\frac{4V}{\pi H}}$$

wherein:

$D$ = the effective diameter of the speaker cone;
$H$ = the total linear displacement of the voice coil in inches; and
$V$ = the volume, in cubic inches, of fluid displaced by the speaker cone when actuated by the voice coil attached to the apex end of the cone, and to an extent concomitant with the measured linear displacement of the coil.

For example if it were determined that a speaker such as shown in Fig. 1, having an 8 inch nominal diameter, had a fluid volume displacement of 2.8 cubic inches with a linear displacement of the voice coil of 0.1 linear inch, substitution of these values for V and H respectively in theh Equation b above would produce a value for D equal to 6 linear inches.

A specific embodiment of the invention described with reference to Fig. 1 was accomplished using a speaker assembly with an eight-inch nominal diameter, and a voice coil 7 having an impedance of six to eight ohms. The cone was covered by a pump plate 16 secured to the frame flange 3 by means of the retainer ring 5, the plate being provided with a concentric port 17 having a diameter of about 1 5/32 inches. To the frame 2 of the assembly was attached a low voltage transformer 15 having an output of 6.3 volts A. C. with an input of 110–120 volts A. C. at 60 cycles, the leads 11, 12 of the voice coil 7 being connected in the low voltage transformer circuit.

In an atmosphere of air, the speaker assembly was then placed on a torsion balance, with the port 17 opening upward, and the speaker weighed. Current was then passed through the transformer to excite the voice coil by an A. C. current of 6.3 volts, thereby producing a pulsed jet discharge of air through the port. As measured by the increased weight recorded on the torsion balance, the jet thrust exerted was equal to 7 grams. The current was 0.65 ampere, with a volt amperes input of 4.1. On such basis, the thrust was calculated to be about 1.7 grams per watt. By comparison, to produce the same thrust by means of a motor-driven blower required an input to the motor of 14 watts, or 0.5 grams per watt. In other words, the apparatus according to this invention produced a thrust which was 3.4 times greater per watt of input power than did the motor-driven blower. Inasmuch as the fluid circulation effect produced may be directly related to the thrust imparted to the fluid circulated, the thrust per watt is a direct measure of efficiency. This efficiency is also reflected in the loss of energy by generation of heat in the actuating means. For the same degree of fluid circulation produced, it was found that in the fluid pump according to the present invention the heat generated was less than 1/3.4 of that generated by the motor driving the equivalent blower. This difference in generated heat is of real significance when the ambient temperature of the atmosphere of a confined space is to be closely controlled over an extended period, while maintaining continuous circulation of a confined atmospheric fluid as later described.

Figure 2:
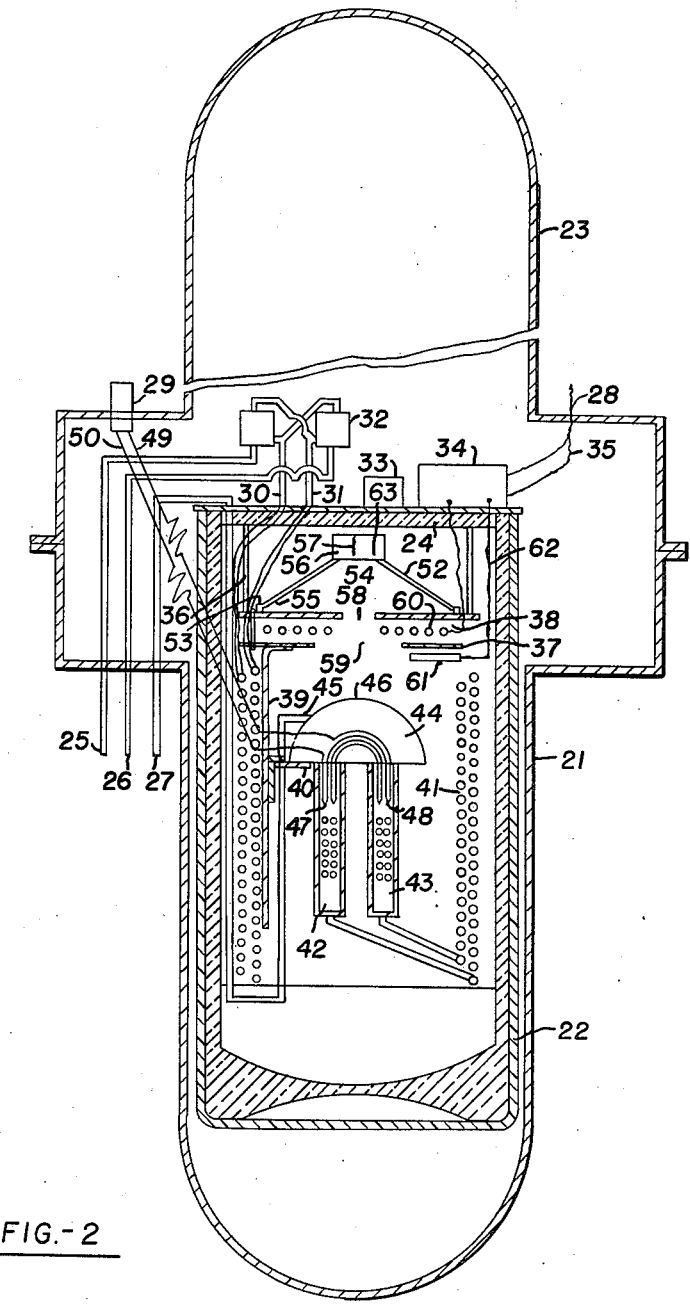
Fig. 2 is a view in side elevation of a structure, in which the pump mechanism of Fig. 1 is combined with an analyzer instrument so as to provide for maintenance of a substantially constant ambient temperature within a housing for the instrument.

To provide an example of a typical utilization of the apparatus as described with reference to Fig. 1, its combination with a means for determining a key component in a mixture of gaseous materials is illustrated in Fig. 2. Referring to the apparatus as illustrated in Fig. 2, the numeral 21 designates a protective housing for an insulated casing vessel, such as a Dewar flask, designated by the numeral 22. The housing is provided with a separable domed housing closure 23, forming a removable cover for the portion 21, and the vessel 22 is provided with an insulated cover 24. Provision is made in both the casing vessel 22 and in the housing 21 for the entrance of suitable conduits for fluids and electrical connections as may be required, and substantially as indicated by the numerals 25, 26, 27, 28, 29, 30 and 31.

The outer surface of the insulated cover 24 provides a support and base for miscellaneous operating and control equipment, such as illustrated diagrammatically in the drawing, and wherein the numeral 32 designates means, such as a four-way valve, for alternately directing fluid flow from conduits 25 and 26 respectively into conduits 30 and 31 respectively; the numeral 33 designates a low voltage transformer; and the numeral 34 collectively designates such means as electrical relays, thermostat controls, heater operating switches and the like, required for purposes as later may be described, all of which are connected to suitable sources of power by leads, indicated by the numeral 35, introduced by way of the conduit 28.

The cover 24 also provides support for operating elements disposed internally of the casing 22. As shown, two or more rods 36 are secured to the undersurface of the cover substantially as shown, and depend therefrom. Supported by the rods and spaced one from the other are a pair of plate elements, 37 and 38, extending in parallel spaced relation to each other transversely of the casing 22.

The innermost plate 37 supports a dependent bar support 39 having an angle support arm 40 extending therefrom radially of the casing 22 and at an intermediate level therein. In the structure as shown, the innermost plate 37 is of lesser diameter than the outer plate 38. Also supported within the casing 22 is a heat exchanger coil 41 which consists of a helically wound extension of the conduits 30 and 31. The coil is concentric with the casing 22 and in radially spaced relation to the inner wall surface thereof, and arranged so as to provide a substantially tubular enclosure within the coil outwardly of the support 39. Within this enclosure is disposed an analyzer instrument supported concentrically of the casing by means of the arm 40.

In the apparatus illustrated, the instrument is one such as is described and set forth according to a copending application for United States Letters Patent, Serial No. 306,993, filed on August 29, 1952, now abandoned. As shown, the instrument includes a pair of adsorption-desorption cells 42 and 43, respectively, each connected at one end to the exit end of one of the conduits 30 and 31 in the coil 41. Each of the cells 42 and 43 contains a bed of an adsorbent material which may be a beaded silica gel desiccant known as "sova beads," or another adsorbent material such as activated alumina, metal oxides, adsorbent cotton, activated carbon, etc., all as set forth according to the above-mentioned copending application and for the purpose also set forth therein. The cells 42 and 43 open at their other ends into a common chambered portion 44, which in turn communicates with a discharge conduit 45 extended in any convenient manner into connection with the conduit 27, through the cover 24. A diffusion cap or shield 46 is provided for the chamber 44 and cells 42 and 43. Within each cell 42 and 43 is a thermopile 47 and 48, respectively, from which the leads 49 and 50, respectively, are conducted from the interior of the casing to a suitable temperature measuring instrument (not shown) by way of the conduit 29.

In the apparatus as illustrated by Fig. 2, the plate 38 is the equivalent of the pump plate 16 shown in Fig. 1. The plate has an obverse side, which faces toward the inner surface of cover 24, to which is secured the flanged base end 51 of a frame 52, with the base end 53 of a conical speaker diaphragm 54 secured between the flange and the plate. In the arrangement as shown, the corrugations 55, coil 56, and magnet 57 correspond to similar parts designated in Fig. 1 by the numerals 6, 7, and 8, respectively. Plate 38, likewise, is provided with a port 58 defined concentrically thereof and corresponding to the port 17 of Fig. 1. Although in the preferred form of the apparatus as illustrated, the port 58 is disposed concentrically with the plate and coaxially of the diphragm cone, it may be disposed eccentrically if desired.

In the apparatus as represented by Fig. 2, the plate 37 is spaced from plate 38 by a distance not less than the diameter of the port 58 and preferably not less than two port diameters nor more than six diameters. The plate 37 is itself provided with port 59 coaxially related to the port 58 and having a diameter which is not substantially less than twice the diameter nor more than six times the diameter of the port 58. The diameter of the port 59 is directly related to the spacing of the plates 37 and 38, the smaller port being employed in conjunction with the closer spacing. The port 59 is always disposed in coaxial alignment with the port 58. In the space between the pump plate 36 and baffle plate 37 a heating element is indicated by the numeral 60. In an apparatus of the character specifically contemplated, the heating element 60 is preferably a low resistance electrical conductor of high current capacity connected in a low voltage circuit. In practice of the invention, a bare nichrome wire of about 18 B and S gauge has been employed to carry a 11 volt current. The wire employed had a resistance of 5 ohms. Although under certain circumstances an insulated heater wire might be employed, where it is desirable to provide for close temperature control a low voltage, low resistance, high current capacity circuit is preferred. Under other circumstances, tubular conduit elements may be substituted for the electric elements to provide for the circulation of hot or cold fluids in heat exchange relation to the atmosphere of a container, such as the vessel 22. The wire 60, as shown, passes through the cover 24 to connect with suitable terminals in a current source indicated by the numeral 34. As indicated, the current passed through the element 60 may be controlled by thermostatic means, as by a mercury-in-glass thermostat element, indicated by the numeral 61 and operatively connected through leads 62 to suitable switch means for the heating element 60. Such means are diagrammatically illustrated and generally designated by the numeral 34. Also, as shown in Fig. 2, the voice coil 56 is connected by leads 63 to a low voltage transformer 33, corresponding to the transformer 15 of Fig. 1.

In operation of the apparatus according to Fig. 2, when employed to determine moisture in a gas, a stream of the gas is first divided into two portions. The one portion is passed into the conduit 25. The other portion is first dried, and then supplied to conduit 26. Flow through conduits 25 and 26 is maintained constant, but on passing through the valve 32, the flow from each of the conduits 25 and 26 is alternately passed into the conduits 30 and 31 whereby first the dry gas portion and then the wet portion is passed through each of the cells 42 and 43 in a regular and repeated cycle. The total gas passed through both cells is vented by way of the conduits 45 and 27.

The moist stream in passing through the adsorbent bed of one of the cells has water vapor removed from it by the adsorbent material until such time as the silica gel comes to equilibrium with water vapor under the existing conditions. The effluent air stream leaving the bed is initially substantially free of water vapor but gradually increases in water content as the adsorbent approaches equilibrium. This increase in the water content of the effluent causes the electrical signal generated by the thermocouples in that cell to increase. This increase in signal strength is augmented by the fact that the adsorbent bed in adsorbing water vapor from the moist stream gives up heat until such time as a state of equilibrium is reached. The amount of adsorbent employed is preferably such that a maximum signal from the thermocouples is generated within a period of 0.1 to 10 minutes, and preferably about 2 minutes. In an actual experiment a signal of 0.350 millivolt was generated by a thermopile consisting of 20 iron constantan couples in each cell when employing a bed of adsorbent one centimeter in diameter and one centimeter deep, and a gas rate of 0.1 C. F. M. The gas in this instance was at a temperature of about 70° F. and contained about 0.02 vol. percent water vapor.

The dry gas stream in passing through the adsorbent bed in the other cell and past the thermocouples forming the thermopile in that cell remove water previously adsorbed by the bed therein and thereby is cooled. The effluent gas leaving the bed contains water vapor, but never as much water vapor as was present in the gas flowing from this bed at the end of the previous cycle when the moist stream was being passed through this same bed. As a result, the thermocouples are exposed to an air stream which has a gradually decreasing water content. It follows that the electrical signal developed by these thermocouples therefore decreases temporarily, due to the fact that the gas stream is being cooled by the desorption process in the bed, and also that the gas stream contacting the thermocouples has a decreasing water content. The thermocouples in thermopiles 47 and 48 are connected in such a way that the signals produced by them are additive. The combined signal is then transmitted through suitable electrical leads 49 and 50 to a measuring instrument such as a millivolt meter (not shown).

The moist stream and the dry stream are passed through each cell for a length of time sufficient to generate a detectable signal and preferably for a length of time sufficient for the signal to reach a maximum value. The amounts of adsorbent in each adsorber cell are preferably such that a maximum signal is reached in a period of 0.1 to 10 minutes and preferably about 2 minutes. At this point valve 32 is actuated either manually or automatically as by a clock-driven switching mechanism to alternate flow of the moist and dry streams through the respective cells. It is apparent from the foregoing description that the electrical signal transmitted to the measuring instrument is an alternating one, and if the instrument is of the recording type will leave an oscillatory trace on a recorder chart. The magnitude of this trace is a function of the moisture content of the moist stream. More specifically, it is a direct measure of the differential moisture content between the moist and dry streams. Once the measuring instrument is calibrated with moist streams of known moisture contents, it may be employed to determine the moisture contents of steams having unknown moisture content.

In order that the ambient temperature of the casing interior be maintained substantially uniform and constant, heat is introduced by means of the heating coil 60 and regulated by the thermostatic means shown. The atmosphere of the casing interior is circulated to avoid stratification by means of the circulator pump assembly including the diaphragm 54, coil 56, magnet 57, which is shown as a permanent magnet, and pump plate 38 operating in substantially the manner described with reference to the apparatus as illustrated by Fig. 1. In the apparatus of Fig. 2, the jet stream which issues from the pump plate port 58 passes through the baffle plate port 59 to produce an eduction effect, drawing gas from the space between the plates, where it has been warmed by the coil 60. The stream, after passage through the port 59 passes over the diffuser shield 46 and around the cells 42 and 43, and is circulated between the tubes of coil 41 passing upwardly in the annular space between the coil and the casing wall. In this process, the stream is brought into indirect heat exchange relation with the gas passing through the coil 41. Passing upwardly through the annular space, at least a portion of the circulated atmosphere is directed radially inward over the heating coil 60 by means of the peripheral extension of pump plate 38 radially beyond the baffle plate 37. A portion of the circulated atmosphere may flow past the periphery of pump plate 38 to produce a certain degree of turbulence and circulation in the space surrounding the diaphragm itself.

What is claimed is:

1. In a heat exchanger apparatus including an insulated housing defining a chamber internally thereof and a cover for said chamber, a first plate element supported from said cover concentrically within said housing extending substantially transversely of said chamber into radially spaced relation to the walls of said housing, a second plate element similarly supported from said cover within said housing coaxially with said first plate, each plate having obverse and reverse surface portions, said second plate extending radially beyond the periphery of said first plate, said extended portion of said second plate defining a radially extending peripheral deflector portion, the reverse surface of said second plate being disposed in opposed relation to the obverse surface of said first plate and in spaced parallel relation thereto, said plates between them defining a circular transverse passageway opening circumferentially and radially inward, each plate further defining an orifice therein wherein said orifices are coaxially related to each other and to said chamber, a first heat exchanger disposed in said circular transverse passageway intermediate said plates and substantially contained within the peripheral limits of the annular surface area of said first plate, a second heat exchanger unit disposed intermediate the reverse surface of said first plate and the adjoining end of said housing, said second heat exchange unit essentially consisting of a pair of helically wound conduit coils also supported from said housing cover in substantially concentric relation one to another and to said housing to define a substantially tubular passageway within the peripheral limits of the annular reverse surface area of said first plate and to define an annular passageway between said coils and the housing wall, means for establishing a temperature differential between said heat exchange units, and means for circulating a gaseous medium contained by said housing into heat exchange relation with said heat exchange units, said means essentially consisting of a substantially conical vibratory diaphragm secured at its base end to the obverse surface of said second plate concentrically therewith, said diaphragm and second plate forming a pulsation chamber, a diaphragm vibrator fixed to the apex end of said diaphragm and means for cyclically actuating said vibrator to produce gas flow into and out of said pulsation chamber through said second plate orifice, whereby said gas is forcibly jetted through said first plate orifice into said tubular passageway, a deflector element supported in said tubular passageway in substantially coaxial relation to said coils and in axially spaced relation to said first plate orifice, said deflector element being adapted to distribute gas jetted through said first plate orifice, and said tubular passageway, over and through said conduit coils into said annular passageway, and thence to said pulsation chamber through said circular transverse passageway and over said first heat exchange unit.

2. A heat exchanger apparatus according to claim 1 wherein the diameter of said orifice defined by said first plate is not substantially less than twice and not substantially more than six times the diameter of said orifice defined by said second plate.

3. A heat exchanger apparatus according to claim 1 wherein the obverse surface portion of said first plate element is spaced from the reverse surface portion of said second plate element by a distance substantially in the range of from one to six times the diameter of said orifice defined by said second plate element.

4. A heat exchanger apparatus according to claim 1 wherein the obverse surface portion of said first plate element is spaced from the reverse surface portion of said second plate element by a distance substantially in the range of from two to six times the diameter of said orifice defined by said second plate element, and wherein the diameter of the orifice defined by said first plate element corresponds directly to the said distance between said obverse and reverse surface portions of said plate elements.

References Cited in the file of this patent
UNITED STATES PATENTS

| | | |
|---|---|---|
| 2,312,712 | Hartline | Mar. 2, 1943 |
| 2,583,906 | Van Guilder | Jan. 29, 1952 |